(12) United States Patent
Colclough, Jr. et al.

(10) Patent No.: US 9,545,616 B2
(45) Date of Patent: Jan. 17, 2017

(54) METHOD AND APPARATUS FOR APPLYING PARTICULATE

(71) Applicant: Standex International Corporation, Salem, NH (US)

(72) Inventors: Howard E. Colclough, Jr., Lynn, MA (US); Alesandro Cucci, Wakefield, MA (US); Kenneth James Farley, Arlington, MA (US); Evans Francois, Newmarket, NH (US); Caspar Pronk, Boston, MA (US)

(73) Assignee: STANDEX INTERNATIONAL CORPORATION, Salem, NH (US)

( * ) Notice: Subject to any disclaimer, the term of this patent is extended or adjusted under 35 U.S.C. 154(b) by 107 days.

(21) Appl. No.: 14/295,672

(22) Filed: Jun. 4, 2014

(65) Prior Publication Data
US 2014/0329672 A1 Nov. 6, 2014

Related U.S. Application Data

(63) Continuation-in-part of application No. 12/743,066, filed as application No. PCT/US2008/085691 on Dec. 5, 2008, now abandoned.

(60) Provisional application No. 60/992,636, filed on Dec. 5, 2007.

(51) Int. Cl.
| | |
|---|---|
| *B01J 20/32* | (2006.01) |
| *B05C 19/04* | (2006.01) |
| *B05B 15/04* | (2006.01) |
| *B05B 7/14* | (2006.01) |
| *B65G 53/46* | (2006.01) |
| *F16K 3/08* | (2006.01) |
| *B05C 19/06* | (2006.01) |

(52) U.S. Cl.
CPC .......... *B01J 20/3295* (2013.01); *B05B 7/1463* (2013.01); *B05C 19/04* (2013.01); *B05C 19/06* (2013.01); *B65G 53/4616* (2013.01); *B65G 53/4633* (2013.01); *F16K 3/08* (2013.01); *B05B 7/1404* (2013.01); *B05B 7/144* (2013.01); *B05B 7/1454* (2013.01)

(58) Field of Classification Search
None
See application file for complete search history.

(56) References Cited

U.S. PATENT DOCUMENTS

| | | | | | |
|---|---|---|---|---|---|
| 4,019,783 | A | * | 4/1977 | Kayser | F23K 3/02 406/130 |
| 2011/0297080 | A1 | * | 12/2011 | Pastrello | B05B 7/144 118/301 |

* cited by examiner

*Primary Examiner* — Binu Thomas
(74) *Attorney, Agent, or Firm* — William B. Ritchie

(57) ABSTRACT

A particulate feeding apparatus for applying particulate, such as super-absorbent materials, to a substrate, such as a fibrous web. A feeder tube for the powder and a rotary gate valve, including one or more holes is provided. This structure may then intermittently feed particulate to an eductor or venturi nozzle. The rotary valve provides an intermittent supply of particulate to a relatively low-pressure zone at the nozzle formed by the venturi action of the passing air stream and the particulate may be distributed precisely where desired. A process for delivering powder to a substrate in precise amounts and distribution patterns is also disclosed.

12 Claims, 4 Drawing Sheets

METHOD AND APPARATUS FOR APPLYING PARTICULATE

This application is a continuation-in-part of U.S. application Ser. No. 12/743,066 filed on Jun. 2, 2011, now abandoned, which claims benefit of PCT Application Serial No. US08/85691 filed on Dec. 5, 2008 pursuant to 35 USC §371, which claims benefit of U.S. Provisional Application Ser. No. 60/992,636 filed on Dec. 5, 2007.

FIELD OF THE INVENTION

This disclosure relates to a method and apparatus for applying a particulate to a substrate and, more particularly, to a method of applying absorbent particulate to a fibrous web for the relatively high speed manufacture of absorbent articles, utilizing a rotary slide gate valve.

BACKGROUND OF THE INVENTION

Absorbent articles, such as disposable diapers, incontinence pads and the like, may be formed by air-laying fibrous materials on a foraminous surface and depositing super-absorbent materials in particulate or powder form across or throughout the fibrous web. The super-absorbent materials may be directed to certain specific areas of the web where fluids may be concentrated to improve the efficiency of containing and absorbing such fluids. It may be desirable to closely control the application of the super-absorbent materials to localized areas of the web where they may encounter liquids due to their relatively higher cost.

Diapers and like absorbent pads may be manufactured at very high production rates, for instance, 200 to 2000 units per minute. In addition, specific patterns of desired absorbency may vary in shape and location depending on the size and intended use of the absorbent pad.

It is thus desirable to provide a particulate metering assembly that has the ability to direct particles in a specific pattern to a specific area in an intermittent fashion, and to do so at a relatively rapid pace.

Super-absorbent particles are generally comprising an outer shell and inner core. Performance of said materials can be negatively impacted due to excessive handling if the outer shell is compromised. Therefore, it is advantageous to provide a particulate metering assembly that uses all the material supplied to it and does not rely on recirculating a portion of unused material.

SUMMARY OF THE INVENTION

In one exemplary embodiment, the present disclosure comprises a particulate feeding apparatus for applying powder, such as super-absorbent materials to a substrate, such as a fibrous web. The apparatus comprises a feeder tube for the powder and a rotary gate valve, including one or more holes, to intermittently feed powder to an eductor or venturi nozzle that creates an air stream. The rotary valve provides an intermittent supply of powder to a relatively low-pressure zone at the nozzle formed by the venturi action of the passing air stream and the powder may be distributed precisely where desired.

In a second embodiment, a process for delivering powder to a substrate in precise amounts and distribution patterns is provided wherein a rotary gate valve having one or more openings in a sealing face may be rotated at high speed to provide a supply of powder to a distribution nozzle. The nozzle may be located in a stream of venturi air. The venturi effect of relatively high-pressure air passing the end of the nozzle may draw the powder into the air stream for precise distribution to a substrate, such as a fibrous web.

The feeding apparatus of the present disclosure may operate to deliver powder in high speed manufacturing processes that may operate to produce diapers at a rate of about 1200 diapers per minute, utilizing valve actuations at increments of about 0.05 seconds.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION OF THE INVENTION

Diapers and other personal hygiene products having a capability of containing and absorbing liquids, such as body fluids, may be manufactured at very high production rates, for instance, 200-2000 units per minute, by laying a web of pulp fiber materials, such as cellulose, onto a conveyor or forming drum through which air may be drawn. As the understanding of the human anatomy has increased, it has become important to improve the absorbency of fluids in specific areas of the diaper, for instance, more in the front and back of the user as opposed to the crotch. In addition, cost and weight considerations demand that a minimum amount of absorbent material be used.

The use of super-absorbent materials or polymers, such as a polyacrylic acid sodium salt, may greatly increase the absorptive capacity of the fibrous web and may be placed strategically where most fluids may collect. Such super-absorbent materials are generally applied in particulate form to portions of the fibrous web by a spray gun or other feeding apparatus. The particulate form of material may include what is termed as a powder. Accordingly, reference to particulate herein may be understood as a material having a largest cross-sectional diameter of 0.10" or less and of varying geometries (e.g., round, oval, etc.). In addition, such super-absorbent materials may include those materials that can absorb up to 500 times its weight in a fluid, such as water. It is worth noting that the super-absorbent polymers may include other resins. For example, such resins may include polyacrylamide polymers, ethylene-maleic anhydride copolymer, cross-linked carboxyl-methyl-cellulose poly (vinyl alcohol), cross-linked polyethylene oxide, and/or starch grafted copolymers of poly (acrylonitrile).

Figure 1A:
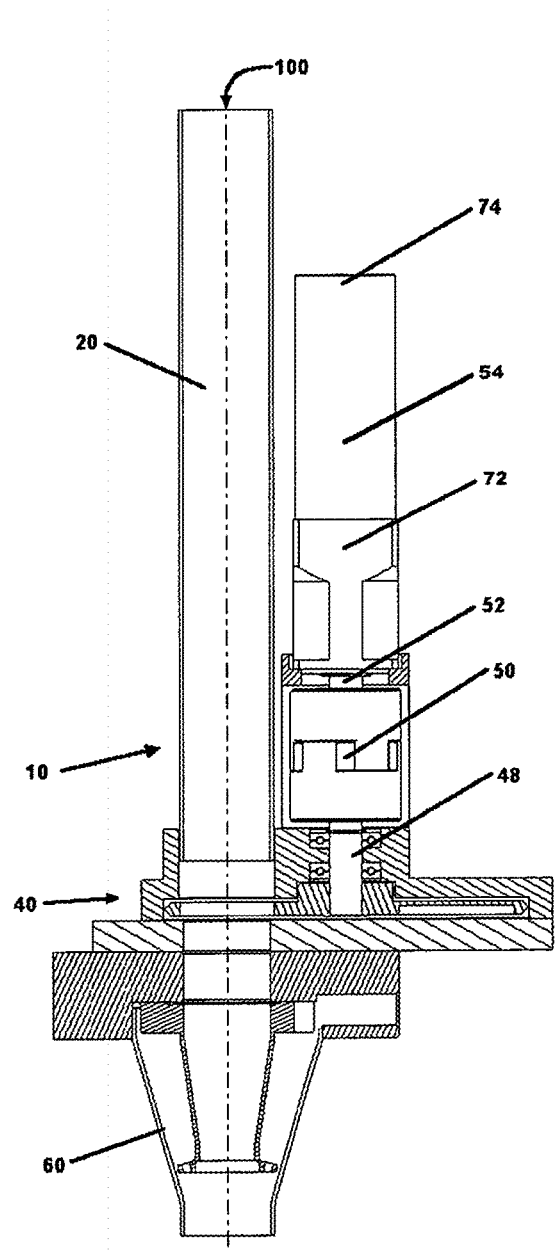
FIG. 1A is a cross-sectional view of the particulate feeding apparatus of the present disclosure.
Figure 1B:
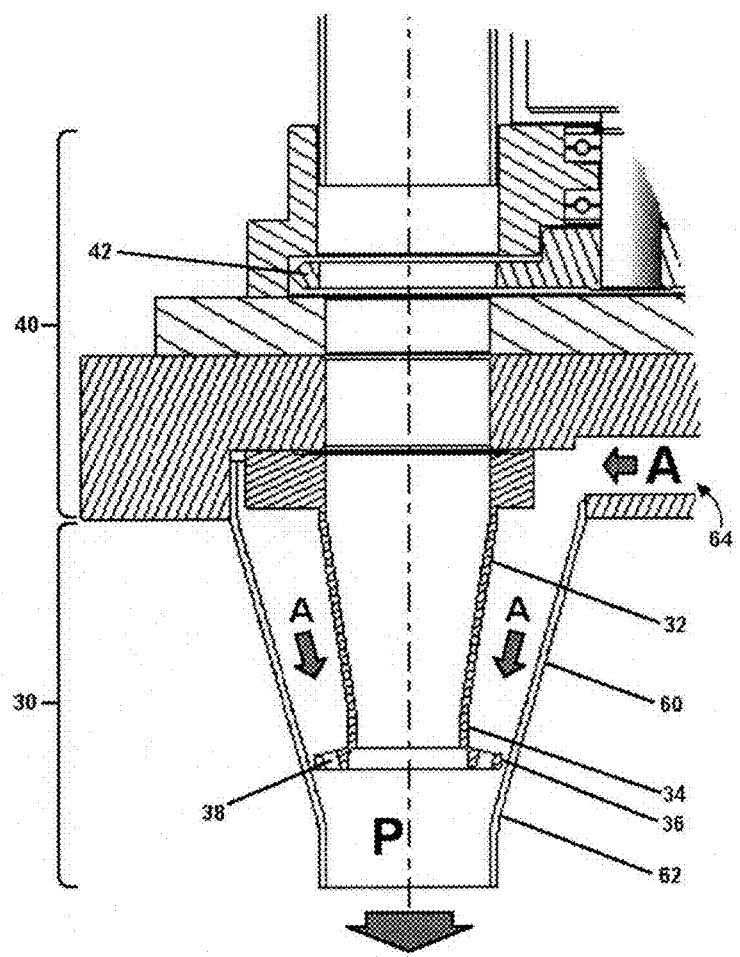
FIG. 1B is an enlarged cross-sectional view of the valve and nozzle of the particulate feeding apparatus of the present disclosure.

To minimize the amount of super-absorbent material used, it may be important to deliver precise quantities to specific areas of the web via a feeder apparatus. Feeding apparatus 10, according to the present disclosure, is illustrated in FIG. 1A. The feeding apparatus may be positioned adjacent to a conveyor or forming drum onto which a fibrous web has been deposited and may direct an intermittent flow of super-absorbent material in powder or particulate form to specific areas and in specific patterns by moving the apparatus relative to the web and by the action of rotary gate valve 40 which may feed powder to venturi nozzle assembly 30 (See FIG. 1B).

Feeding apparatus 10 may further comprise feeder tube 20 that provides particulate material 100 to rotary gate valve 40. The particulate may be fed through tube 20 by gravimetric means, by an auger, by a loss-in-weight device, or other apparatus as is known in the art, which may provide a constant supply of particulate to rotary gate valve 40. In one exemplary embodiment, feeder tube 20 may be a 1½ inch diameter stainless steel tube about 12 inches long.

As shown in FIG. 1A, valve 40 may comprise rotating disc assembly 42 driven by shaft 52 engaged to motor 54 through double-sealed radial bearing 48 and two LOVEJOY shaft couplings 50. The motor may further include gearbox 72 and motor controller 74.

At the output end of feeding apparatus 10, venturi nozzle assembly 30 may be provided to direct the flow of particulate to a fibrous web. The venturi nozzle assembly 30 may comprise inner nozzle 32 that may be aligned along a common longitudinal axis with feeder tube 20. Inner nozzle 32 may have a tapered shape in the form of venturi portion 34 as well as flared end portion 36 including a plurality of through-holes 38. Outer nozzle 60 may be located outside of and concentric with inner nozzle 32.

The venturi nozzles provide a restriction to the flow of air, A, as it passes between nozzles 32 and 60, that may cause an increase in velocity of the air and a drop in pressure, P.

Outer nozzle 60 may have a tapered shape in the form of venturi portion 62 that fits closely over flared end portion 36 of inner nozzle 32. One or more air inlets 64 may be provided at the inlet end of nozzle 32 to provide a supply of pressurized air to nozzle assembly 30.

The flow of a stream of air, A, through nozzle assembly 30 may cause an area of lower pressure, P, to be formed downstream of flared end portion 36 due to the venturi effect and when rotary gate valve 40 is open, collected particulate material 110 may be drawn by suction into air stream, A, and projected from nozzle assembly 30 towards a target substrate (not shown).

Plurality of holes 38 may be angled relative to the longitudinal axis of nozzle assembly 30 to provide a further reduction in pressure at the outlet of inner nozzle 32 and reduce the area of the projected cone of dispersed powder. Holes 38 having a diameter of about 0.005-0.250 inches with either straight or tapered cross-sections and at angles including 0° (or parallel with the longitudinal axis of the nozzle assembly) to 45° from the longitudinal axis of nozzle assembly 30, including all angles there between are contemplated.

Figure 2:
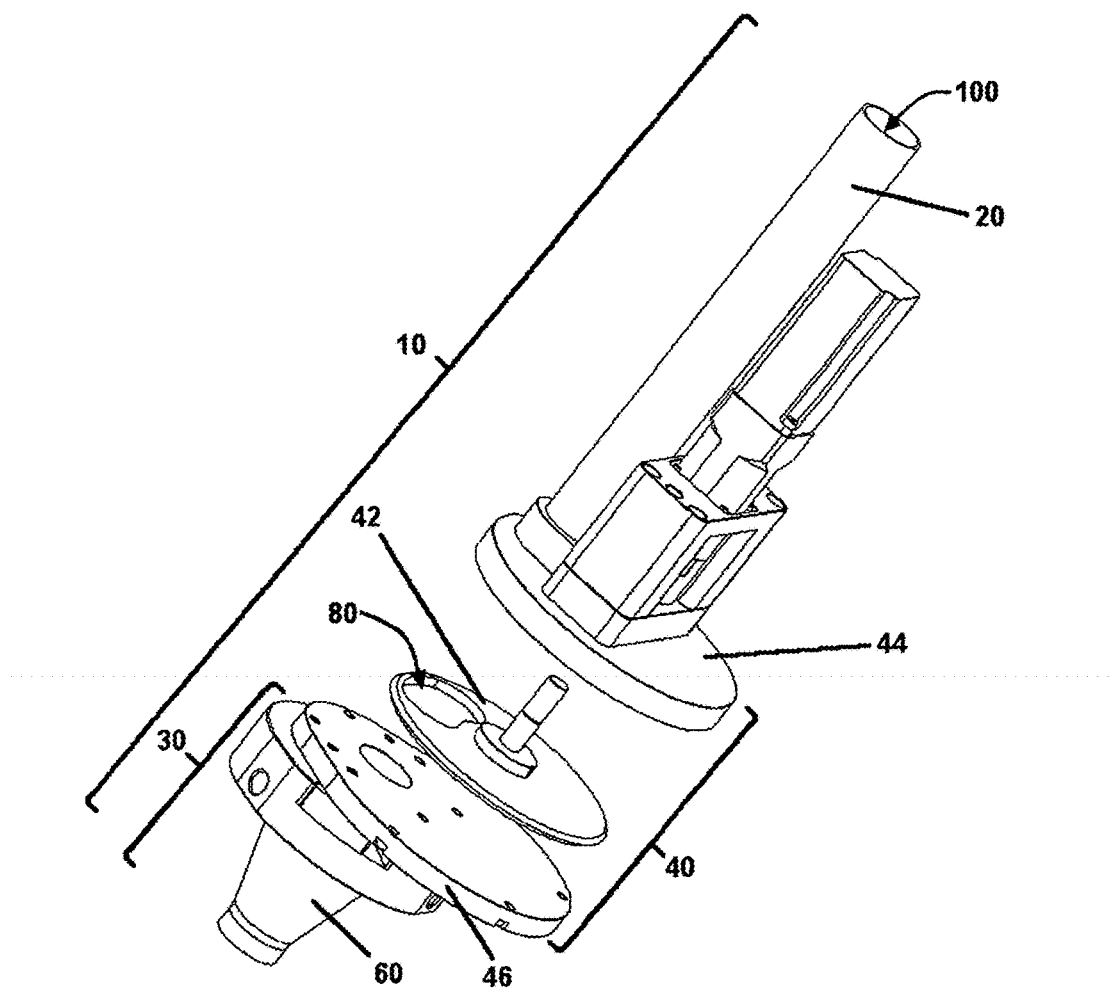
FIG. 2 is an exploded view of the particulate feeding apparatus of FIG. 1, illustrating the rotary gate valve.

FIG. 2 is an exploded view of apparatus 10 of FIG. 1A illustrating more clearly rotary gate valve 40. Valve 40 may comprise rotating disc assembly 42 and top sealing plate 44 and bottom sealing plate 46.

Figure 2A:
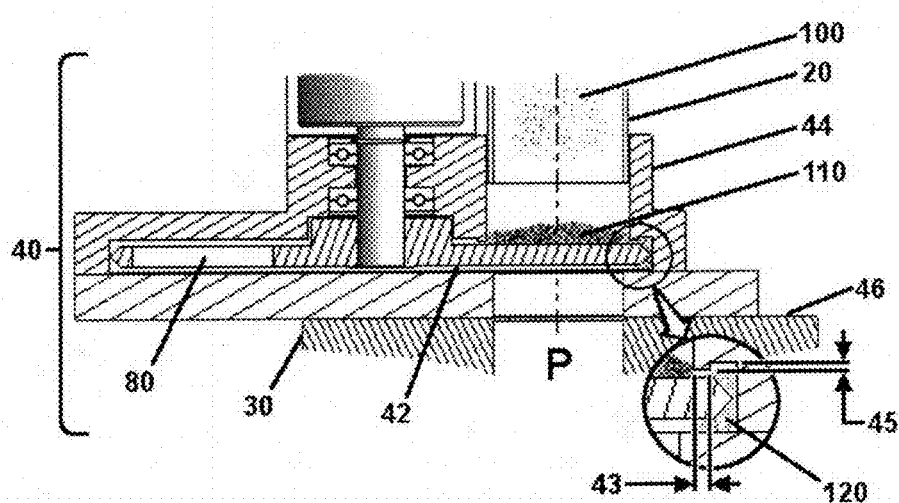
FIG. 2A is a detailed cross-sectional view of the invention.

Now referring to FIG. 2A, top sealing plate 44 may include lip 43 either as an integral part of top sealing plate 44 or as a separate replaceable component. Lip 43 may circumscribe the area below feed tube 20, either as a direct projection of feed tube 20 cross-section or as a transition from feed tube 20 cross-section into another desired geometry; for example, round, oval, rectangular, trapezoidal, cuneal, etc. Lip 43 may further have a gap 45 between itself and a rotating disc assembly 42. Gap 45 may be adjusted through a range of values from zero clearance, that is, actual contact with disc assembly 42 up to some multiple of the particulate material's mean diameter.

For the purposes of this invention and the primary particulate material of interest, gap 45 of between 0.005" to 0.030" was found to be most desirable. While rotating disc assembly 42 is rotating through the closed portion of its cycle, disc assembly 42, top sealing plate 44 and feeder tube 20 may create a chamber wherein particulate material 100 may be collected particulate material 110. The aforementioned gap 45 can be utilized to provide a controlled amount of bypass 120 from collected particulate material 110. FIG. 2A illustrates tested results correlating the value of gap 45 with the percentage of bypass particulate material 120. One or more openings 80 may be formed in rotating disc assembly 42 that when rotated in line with feeding tube 20 allow collected particulate material 110 to be drawn through one or more openings into inner nozzle assembly 32 by low pressure, P, formed by air stream, A, being forced through venturi nozzle assembly 30.

By varying the speed at which rotating disc assembly 42 rotates, it is possible to vary the amount (duration) of powder or particulate 100 directed towards a target substrate such as a web. For instance, disc assembly 42 may be operated at about 1200 rpms with air supplied at about 90 psi to deliver particulate at a rate of about 5-25 g/diaper to a conveying mechanism producing about 1200 diapers per minute. Thus, valve 40 may operate to open and close in increments as small as, for instance, 0.05 seconds, or in the range of 0.03-0.30 seconds, including all values and increments therein. It may therefore be appreciated that one may operate the apparatus herein where the disc may rotate at 200-2000 rpms and the air supplied may be pressures of 10-200 psi, including all values and increments therein. The instantaneous rotational speed of disc assembly 42 may be controlled during a single revolution, or some part thereof, to alter the open and closed time of valve 40 thereby altering position, timing, and spread of the deposited material.

The mean rotational speed of disc assembly 42 may be matched to the substrate speed in order to facilitate proper depositing of the particulate material. Examples of methods and devices that can be used to determine and match the substrate speed are rotational encoders, tachometers (optical and mechanical), position sensors such as Hall Effect and proximity, etc.

The position of the substrate and position of valve 40 may be monitored such that the open position of valve 40 may be adjusted to facilitate proper depositing of the particulate material. Examples of methods and devices that can be used to determine and match the substrate location are noted above.

The operator, through the use of motor control system 74, may adjust instantaneous rotational speed and position of disc assembly 42 with relation to the substrate speed and location thereby modifying depositing of the particulate material.

An automated inspection system such as optical, impedance, etc., may be incorporated to determine the actual location of the deposited particulate material 110 on the substrate. Information from this system may be fed to motor control system 74 to adjust instantaneous rotational speed and position of disc assembly 42 with relation to the substrate speed and location thereby correcting depositing of the particulate material.

Tables, equations, or sets of equations may be stored and utilized by the motor control system 74 to properly calculate instantaneous speed and acceleration and position of disc assembly 42 to account for varying speeds and accelerations of the substrate material.

The size, shape and number of openings may be varied to provide different patterns of coverage of particulate material powder 100 onto a given substrate location. For example, one may provide a generally round pattern, an oval pattern, etc. in one exemplary embodiment opening 80 may be shaped with respect to its cross-sectional area such that the leading edge of the opening may have a lesser or greater cross-sectional area than the trailing edge of the opening (e.g. tapered) such that the distribution of the particulate stream is varied.

In method form, the present disclosure provides a process to localize the application of a powder or particulate material 100 on a substrate by providing a substrate, such as a fibrous web, providing a particulate, such as a super-absorbent material, to be applied precisely to localized areas of the web. The method includes providing a feeding apparatus 10 noted above, which again includes a feeder tube 20, a driven rotary gate valve 40 and a venturi nozzle assembly 30 to direct the powder onto the web. The venturi nozzle assembly includes inner 32 and outer 60 venturi nozzles which when fed with a supply of pressurized air, A, creates an area of relatively low pressure, P, at the outlet or downstream side of rotary gate valve 40. Upon rotation of disc assembly 42 of gate valve 40, one or more openings 80 in disc assembly 42 may align with feeding tube 20 and inner venturi nozzle 32 to allow collected particulate material 110 to be extracted from feeding tube 20 and mixed with air stream, A, that may be directed at the substrate.

Accordingly, the present disclosure provides a relatively high speed and pulsed or intermittent supply of particulate material at selected locations on a substrate, such as a non-woven substrate, which may be used in, e.g., a diaper application. The ability to manufacture and target absorbent particulate, at a selected location, with a selected pattern, and at the speeds noted herein, may therefore provide a relatively more efficient manufacturing operation that may be essential for the formation of products that require a relatively high volume of production.

While particular embodiments of the present invention have been disclosed, it should be clear to those skilled in the art that various changes and modifications can be made without departing from the scope of the invention.

What is claimed is:

1. An operator adjustable feeding apparatus for delivering a quantity of super absorbent particulate in a specific pattern to a specific area in an intermittent delivery to a substrate wherein some areas of the substrate receive more super absorbent particulate than others and wherein said operator adjustable feeding apparatus does not rely on recirculating a portion of unused super absorbent particulate, said operator adjustable feeding apparatus comprises:
   a feeder tube for storage of the super absorbent particulate and delivering a constant supply of the super absorbent particulate, said feeder tube having a longitudinal axis and having a top and a bottom;
   a lip circumscribed below the bottom of said feeder tube;
   a rotary gate valve assembly aligned with the longitudinal axis of said feeder tube to receive super absorbent particulate from said feeder tube, said rotary gate valve assembly comprising:
   a rotating disc having a top and a bottom; wherein said rotating disc also having at least one opening having a size and a shape wherein the size and shape of said at least one said opening in said rotating disc is predetermined to provide different patterns of coverage of super absorbent particulate on said substrate; and wherein the rotation of said rotating disc provides an open condition when said at least one opening of said rotating disc is aligned with the longitudinal axis of said feeder tube and provides a closed condition when said at least one opening of said rotating disc is not aligned with the longitudinal axis of said feeder tube; wherein the open and closed condition provided by said rotating disc provides the intermittent supply of super absorbent particulate;
   a top sealing plate for sealing the top of said rotating disc to said lip and wherein said top sealing plate is adjacent to said lip;
   an adjustable gap between said lip associated with said top sealing plate and said rotating disc to provide a chamber such that when said rotating disc is in the closed condition, super absorbent particulate is accumulated in the chamber to provide a controllable amount of bypass of super absorbent particulate and when said rotating disc is in the open position, the accumulated super absorbent particulate is then deliverable to the substrate.

2. The feeder apparatus of claim 1 further comprising:
   a venturi nozzle assembly aligned with longitudinal axis of said feeder tube, to receive super absorbent particulate from the rotating gate valve assembly, said venturi nozzle assembly comprising:
   a tapered inner nozzle aligned with the longitudinal axis of said feeder tube, said inner nozzle having a venturi portion with a flared end;
   a tapered outer nozzle positioned outside of said inner nozzle and concentric with said inner nozzle, said outer nozzle also having a venturi portion that is positioned over the flared end of said inner nozzle and is immediately adjacent thereto, such that a flow of air through said outer nozzle produces an increase in velocity of the air and a corresponding drop in pressure downstream of the flared end of said inner nozzle such that super absorbent particulate provided by said rotary gate valve assembly is sucked into an air stream and deposited on the substrate.

3. The feeder apparatus of claim 1 wherein said lip is in a integral part of said top sealing plate.

4. The feeder apparatus of claim 1 wherein said lip is shaped as a transition from the cross-sectional shape of said feeder tube into a distinctly different transitional cross-sectional shape.

5. The feeder apparatus of claim 1 wherein said gap ranges in size from 0.005 inches to 0.030 inches.

6. The feeder apparatus of claim 1 wherein a time period between the open condition of said rotary disc to the closed condition of said rotary disc ranges from 0.03 seconds to 0.30 seconds.

7. The feeder apparatus of claim 1 further comprising a motor control system for controlling an instantaneous rotational speed and position of said rotating disc in relation to the substrate being fed beneath said feeder apparatus thus modifying the delivery of the super absorbent particulate on the substrate.

8. The feeder apparatus of claim 2 wherein the flared end of said inner nozzle further comprises a plurality of through-holes angled relative to the longitudinal axis of said nozzle assembly for the purpose of increasing a venturi effect of said nozzle assembly.

9. The feeder apparatus of claim 8 wherein said through-holes in said inner nozzle range in diameter from 0.005 inches to 0.250 inches.

10. The feeder apparatus of claim 2 wherein the air supplied to said outer nozzle ranges in pressure from 10 PSI to 200 PSI.

11. The feeder apparatus of claim 1 wherein said gap is a multiple of a mean diameter of a particulate size that forms the super absorbent particulate.

12. The feeder apparatus of claim 1 wherein said feeder tube is gravity fed with free-floating super absorbent particulate under ambient atmospheric conditions.

* * * * *